US010696103B2

(12) United States Patent
Lee

(10) Patent No.: US 10,696,103 B2
(45) Date of Patent: Jun. 30, 2020

(54) TIRE ABRASION CONFIRMATION SYSTEM, METHOD THEREOF AND NON-TRANSITORY COMPUTER READABLE STORAGE MEDIUM HAVING COMPUTER PROGRAM RECORDED THEREON

(71) Applicant: SK Planet Co., Ltd., Seongnam-si, Gyeonggi-do (KR)

(72) Inventor: GiDong Lee, Seoul (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 302 days.

(21) Appl. No.: 15/841,155

(22) Filed: Dec. 13, 2017

(65) Prior Publication Data

US 2018/0178590 A1 Jun. 28, 2018

(30) Foreign Application Priority Data

Dec. 22, 2016 (KR) .................. 10-2016-0176449

(51) Int. Cl.
*B60C 11/24* (2006.01)
*G07C 5/08* (2006.01)
*G07C 5/00* (2006.01)

(52) U.S. Cl.
CPC ............ *B60C 11/246* (2013.01); *G07C 5/008* (2013.01); *G07C 5/0808* (2013.01)

(58) Field of Classification Search
CPC ...... B60C 11/246; G07C 5/008; G07C 5/0808
See application file for complete search history.

(56) References Cited

U.S. PATENT DOCUMENTS

| | | | | |
|---|---|---|---|---|
| 2004/0154715 A1* | 8/2004 | Dufournier | ............. | B60C 11/24 152/154.2 |
| 2004/0243293 A1* | 12/2004 | Tominaga | ............. | B60C 23/061 701/41 |
| 2005/0150283 A1* | 7/2005 | Shick | ...................... | B60C 11/24 73/146 |
| 2009/0024269 A1* | 1/2009 | Shorten | ................. | G01M 1/122 701/31.4 |
| 2010/0186492 A1* | 7/2010 | Morinaga | ............... | B60C 11/24 73/146 |
| 2014/0366618 A1* | 12/2014 | Singh | ...................... | B60C 23/04 73/146.3 |

* cited by examiner

*Primary Examiner* — Thomas Ingram
(74) *Attorney, Agent, or Firm* — Fenwick & West LLP

(57) ABSTRACT

Provided are a tire abrasion confirmation system, a method thereof, and a non-transitory computer readable storage medium storing a computer program. That is, according to the present invention, while tire information on the tire mounted on the vehicle is stored in the server, a server confirms an abrasion degree of a tire according to a correlation between a driving distance of a vehicle according to air pressure information of the tire and GPS information based on data on the air pressure information of the tire transmitted from the vehicle, the driving distance of the vehicle, and the like and the GPS information transmitted from a terminal positioned in the vehicle and provides the confirmed abrasion degree of the tire, thereby preventing accidents caused by abrasion of the tire in advance.

7 Claims, 4 Drawing Sheets

TIRE ABRASION CONFIRMATION SYSTEM, METHOD THEREOF AND NON-TRANSITORY COMPUTER READABLE STORAGE MEDIUM HAVING COMPUTER PROGRAM RECORDED THEREON

CROSS-REFERENCE TO RELATED APPLICATION

This application claims the benefit of Republic of Korea Application No. 10-2016-0176449 filed on Dec. 22, 2016 with the Korean Intellectual Property Office, the disclosure of which is incorporated herein by reference.

BACKGROUND

Technical Field

The present invention relates to a tire abrasion confirmation system, a method thereof, and a non-transitory computer readable storage medium storing a computer program, and more particularly, to a tire abrasion confirmation system, a method thereof, and a non-transitory computer readable storage medium storing a computer program in which while tire information on the tire mounted on the vehicle is stored in the server, a server confirms an abrasion degree of a tire according to a correlation between a driving distance of a vehicle according to air pressure information of the tire and GPS information based on data on the air pressure information of the tire transmitted from the vehicle, the driving distance of the vehicle, and the like and the GPS information transmitted from a terminal positioned in the vehicle and provides the confirmed abrasion degree of the tire.

Background Art

In a vehicle, tires which can rotate on wheels are provided and a portion of the tire which is in contact with the road surface is called a tread.

The tread which is the ground surface of the tire is made of a thick rubber layer so as to protect a carcass, a breaker, and the like therein, and in order to ensure a friction coefficient of the road surface and maintain directionality, various shapes of tread marks are processed on the ground surface.

Meanwhile, a groove of the tire tread mark is abraded due to contact with the ground when the vehicle is driven, and as the groove is abraded, a depth of the groove is decreased and thus, the steering and braking performance of the vehicle is deteriorated.

In addition, if the tire is badly abraded, an accident in which the tire is ruptured while driving may occur.

As a method for confirming an abrasion degree (alternatively, abrasion/abrasion state) for the tire of the vehicle, there are passive methods such as a method of inserting a coin to a tire, a method of using an abrasion gauge tool, a method of confirming a tire abrasion limit line (alternatively, an indicator). However, when the user does not periodically check the abrasion state of the tire or when the abrasion of the tire of the vehicle is accelerated according to a driving style of the vehicle, major accidents may occur due to the abraded tire.

SUMMARY

The present invention has been made in an effort to provide a tire abrasion confirmation system, a method thereof, and a non-transitory computer readable storage medium storing a computer program in which while tire information on the tire mounted on the vehicle is stored in the server, a server confirms an abrasion degree of a tire according to a correlation between a driving distance of a vehicle according to air pressure information of the tire and GPS information based on data on the air pressure information of the tire transmitted from the vehicle, the driving distance of the vehicle, and the like and the GPS information transmitted from a terminal positioned in the vehicle and provides the confirmed abrasion degree of the tire.

An embodiment of the present invention provides a tire abrasion confirmation method comprising steps of: receiving, by a communication unit, tire information on a tire mounted on a vehicle and vehicle information, the tire information and the vehicle information being transmitted from an on board diagnostics (OBD) installed in the vehicle or a terminal which communicates with the OBD; receiving, by the communication unit, air pressure information of the tire mounted on the vehicle and trip information which are transmitted from the OBD; receiving, by the communication unit, position information of the terminal transmitted from the terminal which communicates with the OBD; analyzing, by a control unit, a correlation between the air pressure information of the tire and a driving distance of the vehicle in the trip information based on the received air pressure information of the tire and the received trip information; confirming, when the vehicle is determined to be driven in a straight section based on the position information of the terminal, by the control unit, an abrasion state of the tire based on a corrected driving distance of the vehicle and the position information of the terminal, the corrected driving distance of the vehicle being obtained based on the analyzed correlation; and controlling, when the abrasion state of the tire is in a good state as the confirming result, by the control unit, the communication unit to transmit information indicating that an abrasion degree of the tire is in a good state to the OBD or the terminal.

The analyzing of the correlation between the air pressure information of the tire and the driving distance of the vehicle in the trip information may include steps of: calculating a correction coefficient by analyzing the correlation between the air pressure information of the tire and the driving distance of the vehicle in the trip information; and calculating the corrected driving distance of the vehicle by applying the calculated correction coefficient to the driving distance of the vehicle.

In the confirming of the abrasion state of the tire, the control unit may confirm whether the corrected driving distance of the vehicle which moves in the straight section is included within a predetermined error range for the distance of the straight section according to the position information of the terminal, when the vehicle on which the user carrying the terminal is boarded is driven in a straight section according to the position information of the terminal.

In the controlling of the communication unit to transmit information indicating that the abrasion degree of the tire is in the good state to the OBD or the terminal, the control unit may transmit the information indicating that the abrasion degree of the tire is in the good state to the OBD or the terminal, when the corrected driving distance of the vehicle which moves in the straight section is included within the predetermined error range for the distance of the straight section according to the position information of the terminal.

The tire abrasion confirmation method may further include controlling, by the control unit, the communication unit to transmit alarm information indicating that the abrasion degree of the tire is in a warning state to the OBD or the terminal, when the corrected driving distance of the vehicle which moves in the straight section is not included within the predetermined error range for the distance of the straight section according to the position information of the terminal, as the confirming result.

Another embodiment of the present invention provides a non-transitory computer readable storage medium in which a computer program performing the method according to the aforementioned embodiment is stored.

Yet another embodiment of the present invention provides a tire abrasion confirmation system comprising: a communication unit that receives tire information on a tire mounted on a vehicle and vehicle information, the tire information and the vehicle information being transmitted from an on board diagnostics (OBD) installed in the vehicle or a terminal which communicates with the OBD, receives air pressure information of the tire mounted on the vehicle and trip information which are transmitted from the OBD, and receives position information of the terminal transmitted from the terminal which communicates with the OBD; and a control unit that analyzes a correlation between the air pressure information of the tire and a driving distance of the vehicle in the trip information based on the received air pressure information of the tire and the received trip information and confirms, when the vehicle is driven in a straight section based on the position information of the terminal, an abrasion state of the tire based on a corrected driving distance of the vehicle and the position information of the terminal, the corrected driving distance of the vehicle being obtained based on the analyzed correlation.

The control unit may calculate a correction coefficient by analyzing the correlation between the air pressure information of the tire and the driving distance of the vehicle in the trip information and calculate the corrected driving distance of the vehicle by applying the calculated correction coefficient to the driving distance of the vehicle.

The control unit may confirm whether the corrected driving distance of the vehicle which moves in the straight section is included in a predetermined error range for the distance of the straight section according to the position information of the terminal, when the vehicle on which the user carrying the terminal is boarded is driven in a straight section according to the position information of the terminal.

The control unit may transmit the information indicating that the abrasion degree of the tire is in the good state to the OBD or the terminal, when the corrected driving distance of the vehicle which moves in the straight section is included within the predetermined error range for the distance of the straight section according to the position information of the terminal.

The control unit may control the communication unit to transmit alarm information indicating that the abrasion degree of the tire is in a warning state to the OBD or the terminal, when the corrected driving distance of the vehicle which moves in the straight section is not included within the predetermined error range for the distance of the straight section according to the position information of the terminal.

According to the present invention, while tire information on the tire mounted on the vehicle is stored in the server, a server confirms an abrasion degree of a tire according to a correlation between a driving distance of a vehicle according to air pressure information of the tire and GPS information based on data on the air pressure information of the tire transmitted from the vehicle, the driving distance of the vehicle, and the like and the GPS information transmitted from a terminal positioned in the vehicle and provides the confirmed abrasion degree of the tire, thereby preventing accidents caused by abrasion of the tire in advance.

DETAILED DESCRIPTION

Figure 1:
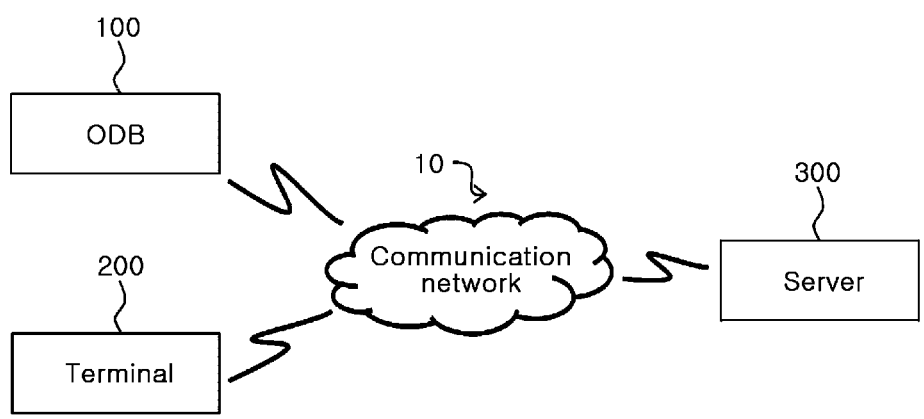
FIG. 1 is a block diagram illustrating a configuration of a tire abrasion confirmation system according to an embodiment of the present invention.

Technical terms used in the present invention are used only to describe specific embodiments, and are not intended to limit the present invention. Further, unless otherwise defined, the technical terms used in the present invention should be interpreted as meanings generally appreciated by those skilled in the art and should not be interpreted as excessively comprehensive meanings or excessively reduced meanings. Further, when the technical term used in the present invention is a wrong technical term that does not accurately express the spirit of the present invention, the technical term should be understood by being substituted by a technical term which can be correctly understood by those skilled in the art. In addition, a general term used in the present invention should be interpreted as defined in a dictionary or contextually, and should not be interpreted as an excessively reduced meaning.

Further, singular expressions used in the present invention include plural expressions unless they have definitely opposite meanings in the context. In the present invention, a term such as "comprising" or "including" should not be interpreted as necessarily including all various components or various steps disclosed in the invention, and it should be interpreted that some component or some steps among them may not be included or additional components or steps may be further included.

Further, terms including an ordinary number, such as first and second, and the like are used for describing various components, but the components are not limited by the terms. The above terms are used only to discriminate one component from the other components. For example, a first component may be referred to as a second component, and similarly, the second component may be referred to as the first component without departing from the scope of the present invention.

Hereinafter, embodiments of the present invention will be described in detail with reference to the accompanying drawings, in which like reference numerals refer to like or similar elements regardless of reference numerals and a duplicated description thereof will be omitted.

Further, in the following description, a detailed explanation of known associated technologies may be omitted to avoid unnecessarily obscuring the subject matter of the present disclosure. Further, it is noted that the accompanying drawings are only for easily understanding the spirit of the present invention and it should not be interpreted that the spirit of the present invention is limited by the accompanying drawings.

FIG. 1 is a block diagram illustrating a configuration of a tire abrasion confirmation system 10 according to an embodiment of the present invention.

As illustrated in FIG. 1, the tire abrasion confirmation system 10 is constituted by an on board diagnostics 100, a terminal 200, and a server 300. All the components of the tire abrasion confirmation system 10 illustrated in FIG. 1 are not required components, and the tire abrasion confirmation system 10 may be embodied by more components than the components illustrated in FIG. 1 or less components therethan.

The server 300 stores tire information on a tire mounted on a vehicle, vehicle information, identification information of the terminal 200, and the like which are transmitted from the on board diagnostics 100 or the terminal 200. Further, the server 300 receives air pressure information of the tire, trip information, and the like which are transmitted from the on board diagnostics 100 and receives position information of the terminal 200 and the like which are transmitted from the terminal 200 carried by a user boarding the corresponding vehicle. Thereafter, the server 300 calculates a correction coefficient by analyzing a correlation between the air pressure information and the driving distance of the vehicle in the trip information based on the air pressure information of the tire and the trip information and corrects the driving distance of the vehicle based on the calculated correction coefficient. Thereafter, when the vehicle drives in a straight section based on the position information of the terminal 200, the server 300 confirms an abrasion state of the tire based on the corrected driving distance of the vehicle and a straight distance corresponding to the straight section. As the confirming result, when the driving distance of the vehicle (alternatively, the corrected driving distance of the vehicle) in the trip information which moves in the corresponding straight section is not included (alternatively, beyond) within a predetermined error range for the distance of the straight section according to the position information of the terminal 200, the server 300 determines that the abrasion degree of the tire (alternatively, the abrasion state of the tire) is serious, generates alarm information indicating that the abrasion degree of the tire is in a warning state, and transmits the generated alarm information to the terminal 200 or the on board diagnostics 100. Further, the terminal 200 or the on board diagnostics 100 displays the alarm information indicating that the abrasion degree of the tire is in a warning state, which is transmitted from the server 300.

The on board diagnostics (OBD) 100 is configured (alternatively, installed/mounted) in a specific vehicle.

Further, the OBD 100 collects a variety of information generated in the vehicle.

Further, the OBD 100 communicates with the terminal 200 positioned in the corresponding vehicle (alternatively, adjacent to the corresponding vehicle) by a short-range communication scheme such as Bluetooth.

Further, the OBD 100 transmits the tire information on the tire mounted on the corresponding vehicle, the vehicle information, and the like to the terminal 200. In this case, the OBD 100 may also directly transmit the tire information on the tire mounted on the corresponding vehicle, the vehicle information, and the like to the server 300. Herein, the tire information includes a vehicle type, a tire model name, a tire type, a sectional width, a flat ratio, a tire structure, an outer diameter of a rim, a limit load index, a limit speed, and the like. In this case, the tire information may be information on each tire with respect to a plurality of tires mounted on the vehicle or integrated information (alternatively, average information) on the plurality of tires. Further, the vehicle information includes a vehicle type, a vehicle number, a name (or a nickname) of a vehicle owner, tire replacement date information, and the like.

Further, the OBD 100 confirms air pressure information on the tire mounted (alternatively, provided) on the corresponding vehicle (including individual air pressure information on the plurality of tires mounted on the vehicle, average air pressure information on the plurality of tires mounted on the vehicle, or the like) by interlocking with a tire pressure monitoring system (TPMS) provided in the corresponding vehicle.

Further, the OBD 100 confirms trip information including a driving distance of the corresponding vehicle, a distance which may be driven by the remaining oil (alternatively, a drivable distance), fuel efficiency, and the like.

Further, the OBD 100 transmits the confirmed air pressure information on the tire, trip information, vehicle information, and the like to the server 300.

Further, the OBD 100 transmits information indicating that the abrasion degree of the tire is in a good state, the alarm information indicating that the abrasion degree of the tire is in a warning state, and the like, which are transmitted from the server 300.

Further, the OBD 100 outputs the received information indicating that the abrasion degree of the tire is in the good state, the received alarm information indicating that the abrasion degree of the tire is in the warning state, and the like.

The function of the OBD 100 according to the embodiment of the present invention may be performed in an electronic control unit (ECU) provided in the vehicle.

The terminal 200 may be applied to various terminals, such as a smart phone, a portable terminal, a mobile terminal, a personal digital assistant (PDA), a portable multimedia player (PMP), a telematics terminal, a navigation terminal, a personal computer, a notebook computer, a slate PC, a tablet PC, an ultrabook, a wearable device (for example, including a smartwatch, a smart glass, a head mounted display (HMD), etc.), a Wibro terminal, an Internet protocol television (IPTV) terminal, a smart TV, a digital broadcasting terminal, a television, a 3D television, a home theater system, an audio video navigation (AVN) terminal, an audio/video (A/V) system, a flexible terminal, and the like.

Figure 2:
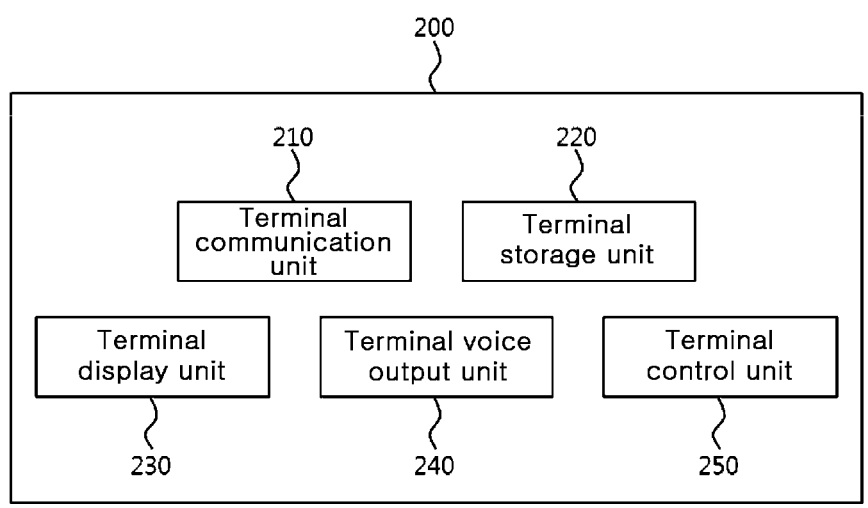
FIG. 2 is a block diagram illustrating a configuration of a terminal according to the embodiment of the present invention.

As illustrated in FIG. 2, the terminal 200 is configured by a terminal communication unit 210, a terminal storage unit 220, a terminal display unit 230, a terminal voice output unit 240, and a terminal control unit 250. All the components of the terminal 200 illustrated in FIG. 2 are not required components, and the terminal 200 may be embodied by more components than the components illustrated in FIG. 2 or less components therethan.

The terminal communication unit 210 communicates with any internal component or at least one external terminal via a wired/wireless communication network. In this case, any external terminal may include the OBD 100, the server 300, and the like. Herein, the wireless Internet technology may include wireless LAN (WLAN), digital living network alliance (DLNA), wireless broadband (Wibro), world interoperability for microwave access (WIMAX), high speed downlink packet access (HSDPA), high speed uplink packet access (HSUPA), IEEE 802.16, long term evolution (LTE), long term evolution-advanced (LTE-A), wireless mobile broadband service (WMBS), and the like. The terminal communication unit 210 transmits and receives data according to at least one wireless Internet technology in a range including Internet technologies which are not listed above. Further, the short range communication technology may include Bluetooth, radio frequency identification (RFID), Infrared data association (IrDA), ultra wideband (UWB), ZigBee, near field communication (NFC), ultra sound communication (USC), visible light communication (VLC), Wi-Fi, Wi-Fi Direct, and the like. In addition, the wired communication technology may include power line communication (PLC), USB communication, Ethernet, serial communication, optical/coaxial cables, and the like.

Further, the terminal communication unit 210 may mutually transmit the information with any terminal through a universal serial bus (USB).

Further, the terminal communication unit 210 transmits and receives wireless signals with a base station, the OBD 100, the server 300, and the like on a mobile communication network constructed according to technology standards or communication schemes (for example, GSM (Global System for Mobile communication), CDMA (Code Division Multi Access), CDMA2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTE-A (Long Term Evolution-Advanced), etc.) for mobile communication.

Further, the terminal communication unit 210 communicates (alternatively, is connected) with the OBD 100 through the short range communication scheme, by a control of the terminal control unit 250.

Further, the terminal communication unit 210 receives the tire information on the tire mounted on the vehicle, the vehicle information, and the like, which are transmitted from the OBD 100, by the control of the terminal control unit 250.

Further, the terminal communication unit 210 transmits the tire information on the tire mounted on the vehicle, the vehicle information, the identification information of the terminal 200, and the like, by the control of the terminal control unit 250. Herein, the identification information of the terminal 200 includes a mobile directory number (MDN), a mobile IP, a mobile MAC, subscriber identity module (Sim) card unique information, a serial number, and the like.

The terminal storage unit 220 stores various user interfaces (UIs) and graphic user interfaces (GUIs), and the like.

Further, the terminal storage unit 220 stores data, programs, and the like which are required to operate the terminal 200.

That is, the terminal storage unit 220 may store a plurality of application programs (alternatively, applications) driven in the terminal 200 and data and commends for the operation of the terminal 200. At least some of the application programs may be downloaded from an external service providing apparatus through wireless communication. Further, at least some of the application programs may be present on the terminal 200 from a release time for basic functions (for example, call receiving and sending functions and message receiving and sending functions) of the terminal 200. Meanwhile, the application programs are stored in the terminal storage unit 220, installed in the terminal 200, and then driven to perform an operation (alternatively, functions) of the terminal 200 by the terminal control unit 250.

Further, the terminal storage unit 220 may include at least one storage medium of a flash memory type storage medium, a hard disk type storage medium, a multimedia card micro type storage medium, a card type memory (for example, an SD or XD memory, or the like), a magnetic memory, a magnetic disk, an optical disk, a random access memory (RAM), a static random access memory (SRAM), a read-only memory (ROM), an electrically erasable programmable read-only memory (EEPROM), and a programmable read-only memory (PROM). Further, the terminal 200 may operate a web storage which performs a storage function of the terminal storage unit 220 on the Internet or operate in association with the web storage.

Further, the terminal storage unit 220 stores the tire information on the tire mounted on the vehicle, the vehicle information, and the like, which are received by the terminal communication unit 210 by the control of the terminal control unit 250.

The terminal display unit 230 may display various contents such as various menu screens by using a user interface and/or a graphic user interface stored in the terminal storage unit 220 by the control of the terminal control unit 250. Herein, the contents displayed on the terminal display unit 230 include a menu screen and the like including various texts or image data (including various information data) and data such as icons, a list menu, and a combo box, and the like. Further, the terminal display unit 230 may be a touch screen.

Further, the terminal display unit 230 may include at least one of a liquid crystal display (LCD), a thin film transistor-liquid crystal display (TFT LCD), an organic light-emitting diode (OLED), a flexible display, a 3D display, an e-ink display, and a light emitting diode (LED).

Further, the terminal display unit 230 may be configured as a stereoscopic display unit displaying a stereoscopic image.

A 3D display type such as a stereoscopic type (a glasses type), an auto-stereoscopic type (a glassless type), and a projection type (a holographic type) may be applied to the stereoscopic display unit.

Further, the terminal display unit 230 stores the tire information on the tire mounted on the vehicle, the vehicle information, and the like, which are received by the terminal communication unit 210 by the control of the terminal control unit 250.

The terminal voice output unit 240 outputs voice information included in a processed signal by the terminal control unit 250. Herein, the terminal voice output unit 240 may include a receiver, a speaker, a buzzer, and the like.

Further, the terminal voice output unit 240 outputs a guide voice generated by the terminal control unit 250.

Further, the terminal voice output unit 240 outputs voice information corresponding to the tire information on the tire mounted on the vehicle, the vehicle information, and the like, which are received by the terminal communication unit 210 by the control of the terminal control unit 250.

The terminal control unit 250 executes overall control functions of the terminal 200.

Further, the terminal control unit 250 executes overall control functions of the terminal 200 by using programs and data stored in the terminal storage unit 220. The terminal control unit 250 may include a RAM, a ROM, a CPU, a GPU, and a bus, and the RAM, the ROM, the CPU, and the GPU may be connected to each other through the bus. The CPU accesses the terminal storage unit 220 to perform booting by using an O/S stored in the terminal storage unit 220 and perform various operations by using various programs, contents, data, and the like stored in the terminal storage unit 220.

Further, the terminal control unit 250 performs short-range communication with the OBD 100 through the terminal communication unit 210 when the user carrying the terminal 200 is positioned in a communication range of the vehicle or boards the vehicle.

Further, the terminal control unit 250 confirms a current position of the terminal 200 (alternatively, a current position of the vehicle on which the user carrying the terminal 200 is boarded) by controlling a GPS receiver (not illustrated) provided in the terminal 200. In this case, the position information of the terminal 200 may be confirmed based on a GPS technology, an RF signal application indoor and outdoor positioning technology, and the like.

Herein, the GPS receiver receives a GPS signal transmitted from a satellite and generates (alternatively, creates/confirms) position data of the terminal 200 in real time based on a longitude coordinate and a latitude coordinate included in the received GPS signal. Herein, the generated position data is defined as a current position (alternatively, current position data/current position of vehicle on which the user carrying the terminal 200 is boarded) of the terminal 200. Herein, the position information may also be received via Wi-Fi or WiBro communication as well as the GPS receiver.

Further, the signal received by the GPS receiver may be configured to provide the position information of the terminal to the terminal 200 by using wireless communication schemes such as 802.11 which is the standard for wireless networks for a wireless LAN proposed by the institute of electrical and electronics engineers (IEEE) and a wireless LAN including some infrared communications and the like, 802.15 which is the standard for a wireless personal area network (PAN) including Bluetooth, UWB, ZigBee, and the like, 802.16 which is the standard for a wireless metropolitan area network (MAN) including a city wide area network (FWA) and the like and a broadband wireless access (BWA), and 802.20 which is the standard for mobile Internet for wireless mobile broadband wireless access (MBWA) including Wibro, WiMAX, and the like.

Further, when the terminal 200 is positioned in the corresponding vehicle (alternatively, when the terminal 200 communicates with the OBD 100), the terminal 200 transmits the confirmed position information of the terminal 200, identification information of the terminal 200, and the like to the server 300.

Further, the terminal control unit 250 receives information indicating that the abrasion degree of the tire is in a good state, alarm information indicating that the abrasion degree of the tire is in a warning state, and the like, which are transmitted from the server 300 through the terminal communication unit 210.

Further, the terminal control unit 250 may also transmit the received information indicating that the abrasion degree of the tire is in a good state, the received alarm information indicating that the abrasion degree of the tire is in a warning state, and the like to the OBD 100 included in the vehicle which communicates with the terminal 200 through the terminal communication unit 210.

Further, the terminal control unit 250 outputs the received information indicating that the abrasion degree of the tire is in a good state, the received alarm information indicating that the abrasion degree of the tire is in a warning state, and the like through the terminal display unit 230 and/or the terminal voice output unit 240.

As such, the terminal 200 may performs a relay function of transmitting various information transmitted from the corresponding OBD 100 to the server 300 or transmitting various different information transmitted from the server 300 to the corresponding OBD 100, by communicating with the OBD 100.

Further, the terminal 200 may further include an interface unit (not illustrated) serving as an interface with all external devices connected to the corresponding terminal 200. For example, the interface unit may be constituted by a wired/wireless headset port, an external charger port, a wired/wireless data port, a memory card port, a port connecting devices with identification modules, an audio input/output (I/O) port, a video input/output (I/O) port, an earphone port, and the like. Herein, the identification module is a chip storing various information for authenticating authority of use of the terminal 200 and may include a user identity module (UIM), a subscriber identity module (SIM), a universal subscriber identity module (USIM), and the like. Further, the device provided with the identification module may be prepared in a smart card form. Accordingly, the identification module may be connected with the terminal 200 through the port. Such an interface unit receives data or power from an external device to transmit the received data or power to each component in the terminal 200 or transmit the data in the terminal 200 to the external device.

Further, the interface unit may be a passage through which the power from a cradle is supplied to the corresponding terminal 200 when the terminal 200 is connected with an external cradle, or a passage through which various command signals input from the cradle by the user is transmitted to the corresponding terminal 200. Various command signals input from the cradle or the corresponding power may also operate as a signal for recognizing that the terminal 200 is accurately installed on the cradle.

Further, the terminal 200 may further include an input unit (not illustrated) for receiving a signal according to a button operation or any function selection of the user or receiving a command or a control signal generated by an operation such as touching/scrolling the displayed screen.

The input unit as a means for receiving at least one of a user's command, selection, data, and information may include a plurality of input keys and function keys for receiving figure or text information and setting various functions.

Further, the input unit may use various devices, such as a key pad, a dome switch, a touch pad (constant pressure type/capacitive type), a touch screen, a jog wheel, a jog switch, a jog shuttle, a mouse, a stylus pen, and a touch pen. Particularly, when the terminal display unit 230 is formed in a touch screen form, some or all of the input functions may be performed by the terminal display unit 230.

Further, each component (alternatively, each module) of the terminal 200 may be software stored on a memory (alternatively, the terminal storage unit 220) of the terminal 200. The memory may be an internal memory of the terminal 200 and may an external memory or other types of storage devices. Further, the memory may be a nonvolatile memory. The software stored on the memory may include a set of instructions to allow the terminal 200 to perform a specific operation while executing.

Figure 3:
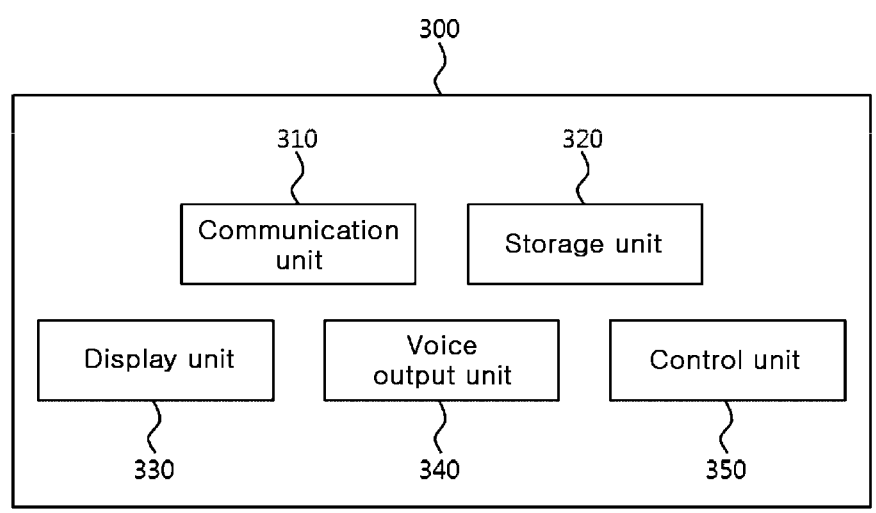
FIG. 3 is a block diagram illustrating a configuration of a server according to the embodiment of the present invention.

As illustrated in FIG. 3, the server 300 is configured by a communication unit 310, a storage unit 320, a display unit 330, a voice output unit 340, and a control unit 350. All the components of the server 300 illustrated in FIG. 3 are not essential components, and the server 300 may be embodied by more components than the components illustrated in FIG. 3 or less components therethan.

The communication unit 310 communicates with any internal component or at least one any external terminal via the wired/wireless communication network. In this case, any external terminal may include the OBD 100, the terminal 200, and the like. Herein, the wireless Internet technology includes WLAN, DLNA, Wibro, Wimax, HSDPA, HSUPA, IEEE 802.16, long term evolution (LTE), LTE-A, wireless Mobile broadband service (WMBS), and the like, and the communication unit 310 transmits/receives data according to at least one wireless Internet technology in a range to include even Internet technologies enumerated above. Further, the short-range communication technology may include Bluetooth, radio frequency identification (RFID), infrared data association (IrDA), ultra wideband (UWB), ZigBee, near field communication (NFC), ultra sound communication (USC), visible light communication (VLC), Wi-Fi, Wi-Fi direct, and the like. In addition, the wired communication technology may include power line communication (PLC), USB communication, Ethernet, serial communication, optical/coaxial cables, and the like.

Further, the communication unit 310 may mutually transmit information with any terminal through a universal serial bus (USB).

Further, the communication unit 310 transmits and receives a wireless signal to or from a base station, the server 300, and the like on a mobile communication network constructed according to technical standards or communication methods (for example, GSM, CDMA, CDMA2000, EV-DO, WCDMA, HSDPA, HSUPA, LTE, LTE-A, etc.) for mobile communication.

Further, the communication unit 310 receives the tire information on the tire mounted on the corresponding vehicle, the vehicle information, the identification information of the terminal 200, and the like, which are transmitted from the OBD 100 included in the vehicle or the terminal 200 which communicates with the corresponding OBD 100, by the control of the control unit 350. Herein, the tire information includes a vehicle type, a tire model name, a tire type, a sectional width, a flat ratio, a tire structure, an outer diameter of a rim, a limit load index, a limit speed, and the like. In this case, the tire information may be information on each tire with respect to a plurality of tires mounted on the vehicle or integrated information (alternatively, average information) on the plurality of tires. Further, the vehicle information includes a vehicle type, a vehicle number, a name (or a nickname) of a vehicle owner, tire replacement date information, and the like. Further, the identification information of the terminal 200 includes a MDN, a mobile IP, a mobile MAC, Sim card unique information, a serial number, and the like. In the case, the server 300 may receive the tire information on the tire mounted on the corresponding vehicle, the vehicle information, the identification information of the terminal 200, and the like, which are transmitted from an electronic control unit (ECU) provided in the corresponding vehicle instead of the OBD 100.

The storage unit 320 stores various user interfaces (UIs) and graphic user interfaces (GUIs), and the like.

Further, the storage unit 320 stores data, programs, and the like which are required to operate the terminal 100.

That is, the storage unit 320 may store a plurality of application programs (alternatively, applications) driven in the server 300 and data and commends for the operation of the server 300. At least some of the application programs may be downloaded from an external service providing apparatus through wireless communication. Further, at least some of the application programs may be present on the server 300 from a release time for basic functions (for example, call receiving and sending functions and message receiving and sending functions) of the server 300. Meanwhile, the application programs are stored in the storage unit 320 and installed in the server 300, and may be driven to perform an operation (alternatively, a function) of the server 300 by the control unit 350.

In addition, the storage unit 320 may include at least one storage medium of a flash memory type, a hard disk type, a multimedia card micro type, a card type memory (for example, an SD or XD memory, or the like), a magnetic memory, a magnetic disk, an optical disk, a RAM, a SRAM, a ROM, an EEPROM, and a PROM. Further, the server 300 may operate a web storage performing a storage function of the storage unit 320 on the Internet or operate in association with the web storage.

Further, the storage unit 320 stores tire information on a tire mounted on a specific vehicle, vehicle information, identification information of the terminal 200, and the like, which are received by the communication unit 310 by the control of the control unit 350.

The display unit 330 may display various contents such as various menu screens and the like by using a user interface and/or a graphic user interface stored in the storage unit 320 by the control of the control unit 300. Herein, the contents displayed on the display unit 330 include a menu screen including various texts or image data (including various information data) and data such as icons, a list menu, and a combo box, and the like. Further, the display unit 330 may be a touch screen.

Further, the display unit 330 may include at least one of a liquid crystal display (LCD), a thin film transistor liquid crystal display (TFT LCD), an organic light emitting diode display (OLED), a flexible display, a 3D display, an electronic ink display, and an LED.

Further, the display unit 330 may be configured as a stereoscopic display unit displaying a stereoscopic image.

A 3D display type such as a stereoscopic type (a glasses type), an auto-stereoscopic type (a glassless type), and a projection type (a holographic type) may be applied to the stereoscopic display unit.

Further, the display unit 330 displays the received tire information on the tire mounted on the specific vehicle, vehicle information, identification information of the terminal 200, and the like, which are received by the communication unit 310, by the control of the control unit 350.

The voice output unit 340 outputs voice information included in a processed signal by the control unit 350. Herein, the voice output unit 340 may include a receiver, a speaker, a buzzer, and the like.

Further, the voice output unit 340 outputs a guide voice generated by the control unit 350.

Further, the voice output unit 340 displays the tire information on the tire mounted on the specific vehicle, vehicle information, the identification information of the terminal 200, and the like, which are received by the communication unit 310, by the control of the control unit 350.

The control unit 350 executes overall control functions of the server 300.

Further, the control unit 350 executes overall control functions of the server 300 by using the programs and data stored in the storage unit 320. The control unit 350 may include a RAM, a ROM, a CPU, a GPU, and a bus, and the RAM, the ROM, the CPU, and the GPU may be connected to each other through the bus. The CPU accesses the storage unit 320 to perform booting by using an O/S stored in the storage unit 320 and perform various operations by using various programs, contents, data, and the like stored in the storage unit 320.

Further, the control unit 350 receives the tire information on the tire mounted on the corresponding vehicle, the vehicle information, the identification information of the terminal 200, and the like, which are transmitted from the OBD 100 included in the vehicle or the terminal 200 which communicates with the corresponding OBD 100.

Further, the control unit 350 stores (alternatively, manages) the received tire information, vehicle information, identification information of the terminal 200, and the like in the storage unit 320.

Further, the control unit 350 receives the air pressure information of the tire, the trip information, the vehicle information, and the like which are transmitted from the OBD 100, through the communication unit 310.

Further, the control unit 350 stores (alternatively, manages) the received air pressure information of the tire, trip information, vehicle information, and the like in the storage unit 320.

Further, the control unit 350 receives the position information of the terminal 200, the identification information of the terminal 200, and the like which are transmitted from the terminal 200, through the communication unit 310.

Further, the control unit 350 stores (alternatively, manages) the received position information of the terminal 200, identification information of the terminal 200, and the like in the storage unit 320.

Further, the control unit 350 analyzes a correlation between the air pressure information of the tire and the driving distance of the vehicle in the trip information based on the received air pressure information of the tire and trip information. In this case, there is an inverse relationship between the air pressure information of the tire and the driving distance of the vehicle.

That is, the control unit 350 calculates a correction coefficient through analysis of the correlation between the air pressure information of the tire and the driving distance of the vehicle because there is a difference in the driving distance of the vehicle according to the air pressure state of the tire.

Further, the control unit 350 calculates the corrected driving distance of the vehicle by applying the calculated correction coefficient to the driving distance of the vehicle.

In this case, when the correction is not required by the correlation analysis, the control unit 350 may use the driving distance of the corresponding vehicle as it is (alternatively, calculate the driving distance of the vehicle corrected by calculating a correction coefficient to '1' and applying the calculated correction coefficient 1 to the corresponding driving distance of the vehicle.

Further, the control unit 350 confirms (alternatively, determines) the abrasion state of the tire based on the above corrected driving distance of the vehicle (alternatively, the driving distance of the vehicle included in the corresponding trip information when the correction is not required according to the above correlation analysis) and the position information of the terminal 200, when the vehicle on which the user carrying the terminal 200 is boarded is driven in the straight section according to the received position information of the terminal 200.

That is, when the vehicle on which the user carrying the terminal 200 is boarded is driven in the straight section according to the received position information of the terminal 200, the control unit 350 confirms (alternatively, determines) whether the driving distance of the vehicle (alternatively, the corrected driving distance of the vehicle) in the trip information which moves in the corresponding straight section is included in a driving distance section (alternatively, a driving distance range) within a predetermined error range (for example, −5% to +5%) for the distance of the straight section according to the position information of the terminal 200.

As the confirming result (alternatively, the determining result), when the driving distance of the vehicle (alternatively, the corrected driving distance of the vehicle) in the trip information which moves in the corresponding straight section is included in the driving distance section (alternatively, the driving distance range) within the predetermined error range (for example, −5% to +5%) for the distance of the straight section according to the position information of the terminal 200, the control unit 350 determines that the abrasion degree of the tire (alternatively, the abrasion state of the tire) is in a good state.

Further, the control unit 350 generates information indicating that the abrasion degree of the tire is in the good state.

Further, the control unit 350 transmits the generated information indicating that the abrasion degree of the tire is in the good state to the terminal 200 associated with the corresponding vehicle or the OBD 100 through the communication unit 310.

Further, as the confirming result (alternatively, the determining result), when the driving distance of the vehicle (alternatively, the corrected driving distance of the vehicle) in the trip information which moves in the corresponding straight section is not included in (alternatively, beyond) the driving distance section (alternatively, the driving distance range) within the predetermined error range (for example, −5% to +5%) for the distance of the straight section according to the position information of the terminal 200, the control unit 350 determines that the abrasion degree of the tire (alternatively, the abrasion state of the tire) is in a serious state.

Further, the control unit 350 generates alarm information indicating that the abrasion degree of the tire is in a warning state.

Further, the control unit 350 transmits the generated alarm information to the terminal 200 or the OBD 100 through the communication unit 310.

Further, the control unit 350 outputs the generated information indicating that the abrasion degree of the tire is in the good state, the alarm information indicating that the abrasion degree of the tire is in the warning state, and the like through the display unit 330 and/or the voice output unit 340.

As such, the control unit 350 continuously uses the data accumulated in the storage unit 320 to enhance accuracy by learning by data mining and machine learning for each section stored in the storage unit 320.

Further, the control unit 350 calculates an abrasion rate of the tire based on the driving distance of the vehicle, the air pressure information of the tire, and the like in the above straight section.

Further, the control unit 350 updates a cumulative abrasion rate for the tire by applying the above-calculated abrasion rate of the tire to a cumulative abrasion rate for the tire associated with the corresponding vehicle stored in the storage unit 320.

Further, the control unit 350 compares the cumulative abrasion rate for the tire with a predetermined threshold value (alternatively, a limit value).

That is, the control unit 350 determines whether the cumulative abrasion rate for the tire is greater than or equal to the predetermined threshold value.

As the determining result, when the cumulative abrasion rate for the tire is less than the predetermined threshold value, the control unit continuously manages the cumulative abrasion rate for the tire.

Further, as the determining result, when the cumulative abrasion rate for the tire is greater than or equal to the predetermined threshold value, the control unit 350 generates alarm information for replacing the tire.

Further, the control unit 350 transmits the generated alarm information for replacing the tire to the terminal 200 or the OBD 100 through the communication unit 310. Further, the terminal or the OBD 100 receives the alarm information for replacing the tire transmitted from the server 300 and outputs the above-received alarm information for replacing the tire so that the user (alternatively, the operator) of the corresponding vehicle recognizes a situation for replacing the tire.

Further, the server 300 may be embodied in forms of a web server, a database server, a proxy server, and the like. Further, in the server 300, a network load distribution mechanism and at least one of a variety of software which allows the server 300 to operate on the Internet or other networks may be installed, and as a result, the server 300 may be embodied by a computerized system. Further, the network may be an http network and may be a private line, Intranet, or any other networks. Furthermore, the server 300 and the terminal 200 may be connected to each other by a security network so as to prevent the data from being attacked by any hacker or other third parties. Further, the server 300 may include a plurality of database servers, and the database server may be embodied to be separately connected with the server 300 through any type of network connection including a distributed database sever architecture.

Further, a processor mounted on the terminal 200 or the server 300 according to the present invention may process a program command for executing the method according to the present invention. In an embodiment, the processor may be a single-threaded processor, and in another embodiment, the present processor may be a multi-threaded processor. Further, the processor may process commands stored in the memory or a storage device.

As such, while tire information on the tire mounted on the vehicle is stored in the server, the server confirms the abrasion degree of the tire according to a correlation between the driving distance of the vehicle according to air pressure information of the tire and the GPS information based on the data on the air pressure information of the tire transmitted from the vehicle, the driving distance of the vehicle, and the like and the GPS information transmitted from the terminal positioned in the vehicle and provides the confirmed abrasion degree of the tire.

Hereinafter, a tire abrasion confirmation method according to the present invention will be described in detail with reference to FIGS. 1 to 4.

Figure 4:
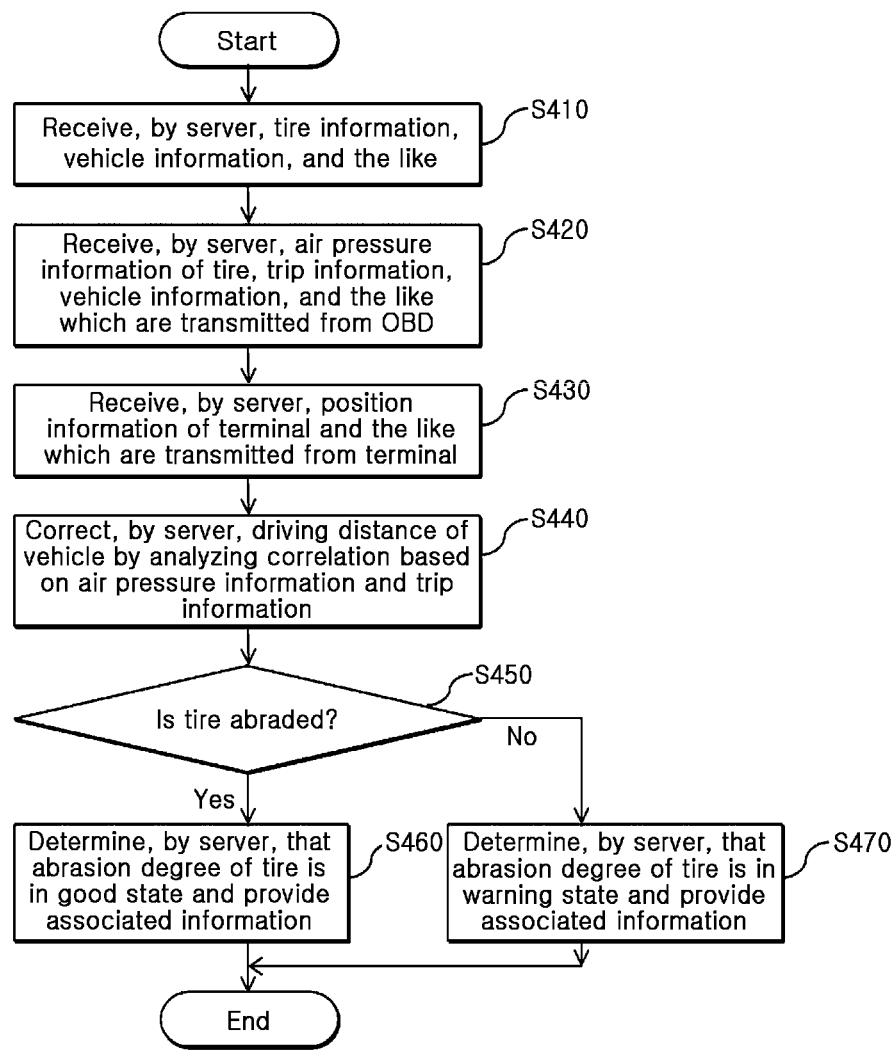
FIG. 4 is a flowchart illustrating a tire abrasion confirmation method according to another embodiment of the present invention.

FIG. 4 is a flowchart illustrating a tire abrasion confirmation method according to another embodiment of the present invention.

First, the server 300 receives tire information on the tire mounted on the corresponding vehicle, vehicle information, identification information of the terminal 200, and the like, which are transmitted from the on board diagnostics (OBD) 100 included in the vehicle or the terminal 200 which communicates with the corresponding OBD 100. Herein, the tire information includes a vehicle type, a tire model name, a tire type, a sectional width, a flat ratio, a tire structure, an outer diameter of a rim, a limit load index, a limit speed, and the like. In this case, the tire information may be information on each tire with respect to a plurality of tires mounted on the vehicle or integrated information (alternatively, average information) on the plurality of tires. Further, the vehicle information includes a vehicle type, a vehicle number, a name (or a nickname) of a vehicle owner, tire replacement date information, and the like. Further, the identification information of the terminal 200 includes a MDN, a mobile IP, a mobile MAC, Sim card unique information, a serial number, and the like. In the case, the server 300 may receive the tire information on the tire mounted on the corresponding vehicle, the vehicle information, the identification information of the terminal 200, and the like, which are transmitted from an electronic control unit (ECU) provided in the corresponding vehicle instead of the OBD 100.

Further, the server 300 stores (alternatively, manages) the received tire information, vehicle information, identification information of the terminal 200, and the like.

For example, the server 300 receives first tire information (for example, average information on four tires mounted on the vehicle), first vehicle information, and the like which are transmitted from the OBD 100.

Thereafter, the OBD 100 confirms air pressure information on the tire mounted (alternatively, provided) on the corresponding vehicle (including individual air pressure information on the plurality of tires mounted on the vehicle, average air pressure information on the plurality of tires mounted on the vehicle, or the like) by interlocking with a tire pressure monitoring system (TPMS) provided in the corresponding vehicle.

Further, the OBD 100 confirms trip information including a driving distance of the corresponding vehicle, a distance which may be driven by the remaining oil (alternatively, a drivable distance), fuel efficiency, and the like.

Further, the OBD 100 transmits the confirmed air pressure information on the tire, trip information, vehicle information, and the like to the server 300.

Further, the control unit 300 receives the air pressure information of the tire, the trip information, the vehicle information, and the like which are transmitted from the OBD 100 and stores (alternatively, manages) the received air pressure information of the tire, trip information, vehicle information, and the like.

For example, the OBD 100 confirms first air pressure information (for example, 30 pound per square inch (PSI)) of the tire mounted on the vehicle by interlocking the TPMS, confirms first trip information including a driving distance of the vehicle, and transmits the first air pressure information, the first trip information, the first vehicle information, and the like to the server 300.

Further, the server 300 receives the first air pressure information, the first trip information, the first vehicle information, and the like which are transmitted from the OBD 100 (S420).

Further, when the terminal 200 is positioned in the corresponding vehicle (alternatively, positioned at a place adjacent to the correspond vehicle outside the vehicle) and communicates with the OBD 100, the terminal 200 confirms position information (alternatively, GPS information) of the corresponding terminal 200. In this case, the position information of the terminal 200 may be confirmed based on a GPS technology, an RF signal application indoor and outdoor positioning technology, and the like.

Further, when the terminal 200 is positioned in the corresponding vehicle (alternatively, when the terminal 200 communicates with the OBD 100), the terminal 200 transmits the confirmed position information of the terminal 200, identification information of the terminal 200, and the like to the server 300.

Further, the server 300 receives the position information of the terminal 200, the identification information of the terminal 200, and the like which are transmitted from the terminal 200 and stores (alternatively, manages) the received position information of the terminal 200, identification information of the terminal 200, and the like.

As an example, when the user carrying the terminal 200 sits in the driver's seat in the vehicle, the terminal 200 confirms the GPS information of the terminal 200 in real time and transmits the confirmed GPS information of the terminal 200, identification information of the terminal 200, and the like to the server 300.

Further, the server 300 receives the GPS information of the terminal 200, the identification information of the terminal 200, and the like, which are transmitted from the terminal 200 (S430).

Thereafter, the server 300 analyzes a correlation between the air pressure information of the tire and the driving distance of the vehicle in the trip information based on the received air pressure information of the tire and trip information. In this case, there is an inverse relationship between the air pressure information of the tire and the driving distance of the vehicle.

That is, the server 300 calculates a correction coefficient through analysis of the correlation between the air pressure information of the tire and the driving distance of the vehicle and calculates the corrected driving distance of the vehicle by applying the calculated correction coefficient to the driving distance of the vehicle, because there is a difference in the driving distance of the vehicle according to the air pressure state of the tire. In this case, when the correction is not required by the correlation analysis, the server 300 may use the driving distance of the corresponding vehicle as it is (alternatively, calculate the driving distance of the vehicle corrected by calculating a correction coefficient to '1' and applying the calculated correction coefficient 1 to the corresponding driving distance of the vehicle.

For example, the first driving distance (for example, 1 Km) of the vehicle in the first air pressure information (for example, 30 PSI) and the second driving distance (for example, 1 Km) of the vehicle in the second air pressure information (for example, 35 PSI) are the same as each other, but the air pressure information is different from each other. The server 300 calculates a correction coefficient for correcting the second driving distance of the vehicle in the second air pressure information by predetermined air pressure information (for example, 30 PSI) and calculates the corrected second driving distance (for example, 998 m) of the vehicle by multiplying the calculated correction coefficient by the second driving distance of the vehicle (S440).

Thereafter, the server 300 confirms (alternatively, determines) the abrasion state of the tire based on the above corrected driving distance of the vehicle (alternatively, the driving distance of the vehicle included in the corresponding trip information when the correction is not required according to the above correlation analysis) and the position information of the terminal 200, when the vehicle on which the user carrying the corresponding terminal 200 is boarded is driven in the straight section according to the received position information of the terminal 200.

That is, when the vehicle on which the user carrying the terminal 200 is boarded is driven in the straight section according to the position information of the terminal 200, the server 300 confirms (alternatively, determines) whether the driving distance of the vehicle (alternatively, the corrected driving distance of the vehicle) in the trip information which moves in the corresponding straight section is included in a driving distance section (alternatively, a driving distance range) within a predetermined error range (for example, −5% to +5%) for the distance of the straight section according to the position information of the terminal 200.

As an example, when the vehicle is driven in the first straight section (for example, 1 Km) by the first air pressure information (for example, 30 PSI) which is a predetermined air pressure reference (for example, 30 PSI), the server 300 confirms whether the driving distance (for example, 1 Km) of the vehicle in the first trip information which moves in the corresponding first straight section is included in a first driving distance section (for example, 950 nm to 1,050 m) within a predetermined error range (for example, −5% to +5%) for the distance (for example, 1 Km) of the straight section corresponding to the first straight section driven by the vehicle based on the GPS information of the terminal 200.

As another example, when the vehicle is driven in the second straight section (for example, 1 Km) by the second air pressure information (for example, 35 PSI) which is different from the predetermined air pressure reference (for example, 30 PSI), the server 300 confirms whether the corrected second driving distance (for example, 998 m) of the vehicle which moves in the corresponding second straight section is included in a second driving distance section (for example, 950 nm to 1,050 m) within a predetermined error range (for example, −5% to +5%) for the distance (for example, 1 Km) of the straight section corresponding to the second straight section driven by the vehicle based on the GPS information of the terminal 200. Herein, the corrected second driving distance of the vehicle may be a value corrected by analyzing the correlation between the air pressure information and the driving distance with respect to the second air pressure information which is different from the predetermined air pressure reference.

As yet another example, when the vehicle is driven in a third straight section (for example, 2 Km) by third air pressure information (for example, 30 PSI) which is the predetermined air pressure reference (for example, 30 PSI), the server 300 confirms whether a driving distance (for example, 1.876 Km) of the vehicle in the second trip information which moves in the corresponding second straight section is included in a third driving distance section (for example, 1.900 Km to 2.100 Km) within a predetermined error range (for example, −5% to +5%) for the distance (for example, 2 Km) of the straight section corresponding to the third straight section driven by the vehicle based on the GPS information of the terminal 200 (S450).

As the confirming result (alternatively, the determining result), when the driving distance of the vehicle (alternatively, the corrected driving distance of the vehicle) in the trip information which moves in the corresponding straight section is included in the driving distance section (alternatively, the driving distance range) within the predetermined error range (for example, −5% to +5%) for the distance of the straight section according to the position information of the terminal 200, the server 300 determines that the abrasion degree of the tire (alternatively, the abrasion state of the tire) is in a good state.

Further, the server 300 transmits information indicating that the abrasion degree of the tire is in the good state to the terminal 200 or the OBD 100.

Further, the terminal 200 or the OBD 100 displays the information indicating that the abrasion degree of the tire is in the good state, which is transmitted from the server 300.

As an example, while the vehicle is driven in the first straight section (for example, 1 Km) by the first air pressure information (for example, 30 PSI) which is a predetermined air pressure reference (for example, 30 PSI), when the driving distance (for example, 1 Km) of the vehicle in the first trip information which moves in the corresponding first straight section is included in the first driving distance section (for example, 950 m to 1,050 m) associated with the first straight section driven by the vehicle based on the GPS information of the terminal 200, the server 300 determines that the abrasion degree of the tire (alternatively, the abrasion state of the tire) is in a good state. Further, the server 300 transmits information indicating that the abrasion degree of the tire is in the good state to the terminal 200. Further, the terminal 200 outputs the information indicating that the abrasion degree of the tire is in the good state which is transmitted from the server 300 in real time.

As another example, while the vehicle is driven in the second straight section (for example, 1 Km) by the second air pressure (for example, 35 PSI) which is different from the predetermined air pressure reference (for example, 30 PSI), when the corrected second driving distance (for example, 998 m) of the vehicle which moves in the corresponding second straight section is included in the second driving distance section (for example, 950 m to 1,050 m) associated with the second straight section driven by the vehicle based on the GPS information of the terminal 200, the server 300 determines that the abrasion degree of the tire (alternatively, the abrasion state of the tire) is in a good state. Further, the server 300 transmits information indicating that the abrasion degree of the tire is in the good state to the terminal 200. Further, the terminal 200 outputs the information indicating that the abrasion degree of the tire is in the good state which is transmitted from the server 300 in real time.

Further, as the confirming result (alternatively, the determining result), when the driving distance of the vehicle (alternatively, the corrected driving distance of the vehicle) in the trip information which moves in the corresponding straight section is not included in (alternatively, beyond) the driving distance section (alternatively, the driving distance range) within the predetermined error range (for example, −5% to +5%) for the distance of the straight section according to the position information of the terminal 200, the server 300 determines that the abrasion degree of the tire (alternatively, the abrasion state of the tire) is in a serious state.

Further, the server 300 generates alarm information indicating that abrasion degree of the tire is in a warning state and transmits the generated alarm information to the terminal 200 or the OBD 100.

Further, the terminal 200 or the vehicle self-diagnosis device 100 displays the alarm information indicating that the abrasion degree of the tire is in a warning state, which is transmitted from the server 300.

As an example, while the vehicle is driven in the third straight section (for example, 2 Km) by the first air pressure information (for example, 30 PSI) which is the predetermined air pressure reference (for example, 30 PSI), when the driving distance (for example, 1.876 Km) of the vehicle in the second trip information which moves in the corresponding third straight section is not included in the third driving distance section (for example, 1.900 Km to 2.100 Km) associated with the third straight section driven by the vehicle based on the GPS information of the terminal 200, the server 300 determines that the abrasion degree of the tire is progressing beyond the predetermined threshold value to generate alarm information indicating that the abrasion degree of the tire is in a warning state and transmit the generated alarm information to the terminal 200. Further, the terminal 200 outputs the alarm information indicating that the abrasion degree of the tire is in the warning state which is transmitted from the server 300 in real time (S470).

The tire abrasion confirmation system according to the embodiment of the present invention can be created by a computer program and codes and code segments configuring the computer program may be easily deduced by a computer programmer in the art. Further, the corresponding computer program is stored in non-transitory computer readable storage media, and read and executed by the computer or the OBD, the terminal, the server, and the like according to the embodiment of the present invention to embody the tire abrasion confirmation system.

The non-transitory computer readable storage medium includes a magnetic storage medium, an optical storage medium, and a carrier wave medium. The computer program embodying the tire abrasion confirmation system according to the embodiment of the present invention may be stored and installed in an embedded memory of the OBD, the terminal, the server, and the like. Alternatively, external memories such as a smart card which stores and installs the computer program embodying the tire abrasion confirmation system according to the embodiment of the present invention may be installed on the tire abrasion confirmation system through an interface.

According to the embodiments of the present invention, as described above, while tire information on the tire mounted on the vehicle is stored in the server, the server confirms the abrasion degree of the tire according to a correlation between the driving distance of the vehicle according to air pressure information of the tire and the GPS information based on the data on the air pressure information of the tire transmitted from the vehicle, the driving distance of the vehicle, and the like and the GPS information transmitted from the terminal positioned in the vehicle and provides the confirmed abrasion degree of the tire, thereby preventing accidents caused by abrasion of the tire in advance.

Hereinabove, although the present invention is described by specific matters such as concrete components, and the like, embodiments, and drawings, they are provided only for assisting in the entire understanding of the present invention. Therefore, the present invention is not limited to the embodiments. Therefore, the embodiments disclosed in the present disclosure are used to not limit but describe the technical spirit of the present disclosure and the scope of the technical spirit of the present disclosure is not limited by the embodiments. The scope of the present invention should be interpreted by the appended claims and all technical spirit in the equivalent range thereto should be interpreted to be embraced by the claims of the present invention.

According to the present invention, while tire information on the tire mounted on the vehicle is stored in the server, a server confirms an abrasion degree of a tire according to a correlation between a driving distance of a vehicle according to air pressure information of the tire and GPS information based on data on the air pressure information of the tire transmitted from the vehicle, the driving distance of the vehicle, and the like and the GPS information transmitted from a terminal positioned in the vehicle and provides the confirmed abrasion degree of the tire, thereby preventing accidents caused by abrasion of the tire in advance. Therefore, the present invention may be widely used in a vehicle management field, a terminal field, a server field, a tire management field, and the like.

What is claimed is:
1. A tire abrasion determination method comprising:
receiving tire information on a tire mounted on a vehicle and vehicle information, the tire information and the vehicle information from an on board diagnostics (OBD) installed in the vehicle or a terminal communicating with the OBD;

receiving air pressure information of the tire mounted on the vehicle and trip information from the OBD;

receiving position information of the terminal from the terminal;

determining a correction coefficient representing a correlation between the air pressure information and a driving distance of the vehicle according to the trip information by analyzing the air pressure information of the tire and the driving distance of the vehicle according to the trip information;

determining a corrected driving distance of the vehicle by applying the determined correction coefficient to the driving distance of the vehicle according to the trip information;

determining an abrasion state of the tire by determining whether the corrected driving distance of the vehicle moving in a straight section falls within a predetermined error range from a distance of the straight section according to the position information of the terminal; and causing the OBD or the terminal to present information on the determined abrasion state to a user.

2. The tire abrasion determination method of claim 1, wherein the presented information indicates that the tire is in a good state when the corrected driving distance of the vehicle falls within the predetermined error range from the distance of the straight section according to the position information of the terminal.

3. The tire abrasion determination method of claim 1, wherein the presented information indicates that the abrasion degree of the tire is in a warning state when the corrected driving distance of the vehicle does not fall within the predetermined error range from the distance of the straight section according to the position information of the terminal.

4. A non-transitory computer readable storage medium storing a computer program comprising a set of instructions, when executed, causing a computer to perform operations comprising:

receiving tire information on a tire mounted on a vehicle and vehicle information, the tire information and the vehicle information being from an on board diagnostics (OBD) installed in the vehicle or a terminal communicating with the OBD;

receiving air pressure information of the tire mounted on the vehicle and trip information from the OBD;

receiving position information of the terminal from the terminal;

determining a correction coefficient representing a correlation between the air pressure information and a driving distance of the vehicle according to the trip information by analyzing the air pressure information of the tire and the driving distance of the vehicle according to the trip information;

determining a corrected driving distance of the vehicle by applying the determined correction coefficient to the driving distance of the vehicle according to the trip information;

determining an abrasion state of the tire by determining whether the corrected driving distance of the vehicle moving in a straight section falls within a predetermined error range from a distance of the straight section according to the position information of the terminal; and causing the OBD or the terminal to present information on the determined abrasion state to a user.

5. A tire abrasion determination system comprising:

a communication unit configured to:

receive tire information on a tire mounted on a vehicle and vehicle information, the tire information and the vehicle information from an on board diagnostics (OBD) installed in the vehicle or a terminal communicating with the OBD, receive air pressure information of the tire mounted on the vehicle and trip information from the OBD, and receive position information of the terminal transmitted from the terminal; and a control unit coupled to the communication unit and configured to:

determine a correction coefficient representing a correlation between the air pressure information and a driving distance of the vehicle according to the trip information by analyzing the air pressure information of the tire and the driving distance of the vehicle according to the trip information;

determine a corrected driving distance of the vehicle by applying the determined correction coefficient to the driving distance of the vehicle according to the trip information;

determine an abrasion state of the tire by determining whether the corrected driving distance of the vehicle moving in a straight section falls within a predetermined error range from a distance of the straight section according to the position information of the terminal; and cause the OBD or the terminal to present information on the determined abrasion state to a user.

6. The tire abrasion determination system of claim 5, wherein the presented information indicates that the tire is in a good state when the corrected driving distance of the vehicle falls within the predetermined error range from the distance of the straight section according to the position information of the terminal.

7. The tire abrasion determination system of claim 5, wherein the terminal the presented information indicates that the abrasion degree of the tire is in a warning state when the corrected driving distance of the vehicle does not fall within the predetermined error range from the distance of the straight section according to the position information of the terminal.

* * * * *